United States Patent [19]
Grochowski et al.

[11] Patent Number: 6,035,389
[45] Date of Patent: Mar. 7, 2000

[54] SCHEDULING INSTRUCTIONS WITH DIFFERENT LATENCIES

[75] Inventors: Edward Grochowski, San Jose; Hans Mulder, San Francisco; Derrick C. Lin, Foster City, all of Calif.

[73] Assignee: Intel Corporation, Santa Clara, Calif.

[21] Appl. No.: 09/132,043

[22] Filed: Aug. 11, 1998

[51] Int. Cl.[7] .................................................... G06F 9/38
[52] U.S. Cl. ......................... 712/216; 712/215; 712/217
[58] Field of Search .................................... 712/215, 216, 712/217

[56] References Cited

U.S. PATENT DOCUMENTS

| | | | |
|---|---|---|---|
| 5,404,469 | 4/1995 | Chung et al. | 712/215 |
| 5,657,315 | 8/1997 | Waclawsky | 370/452 |
| 5,745,724 | 4/1998 | Favor et al. | 712/213 |
| 5,828,868 | 10/1998 | Sager et al. | 713/501 |

*Primary Examiner*—William M. Treat
*Attorney, Agent, or Firm*—Blakely, Sokoloff, Taylor & Zafman LLP

[57] ABSTRACT

An apparatus includes a clock to produce pulses and an electronic hardware structure having a plurality of rows and one or more ports. Each row is adapted to record a separate latency vector written through one of the ports. The latency vector recorded therein is responsive to the clock. A method of dispatching instructions in a processor includes updating a plurality of expected latencies to a portion of rows of a register latency table, and decreasing the expected latencies remaining in other of the rows in response to a clock pulse. The rows of the portion correspond to particular registers.

47 Claims, 8 Drawing Sheets

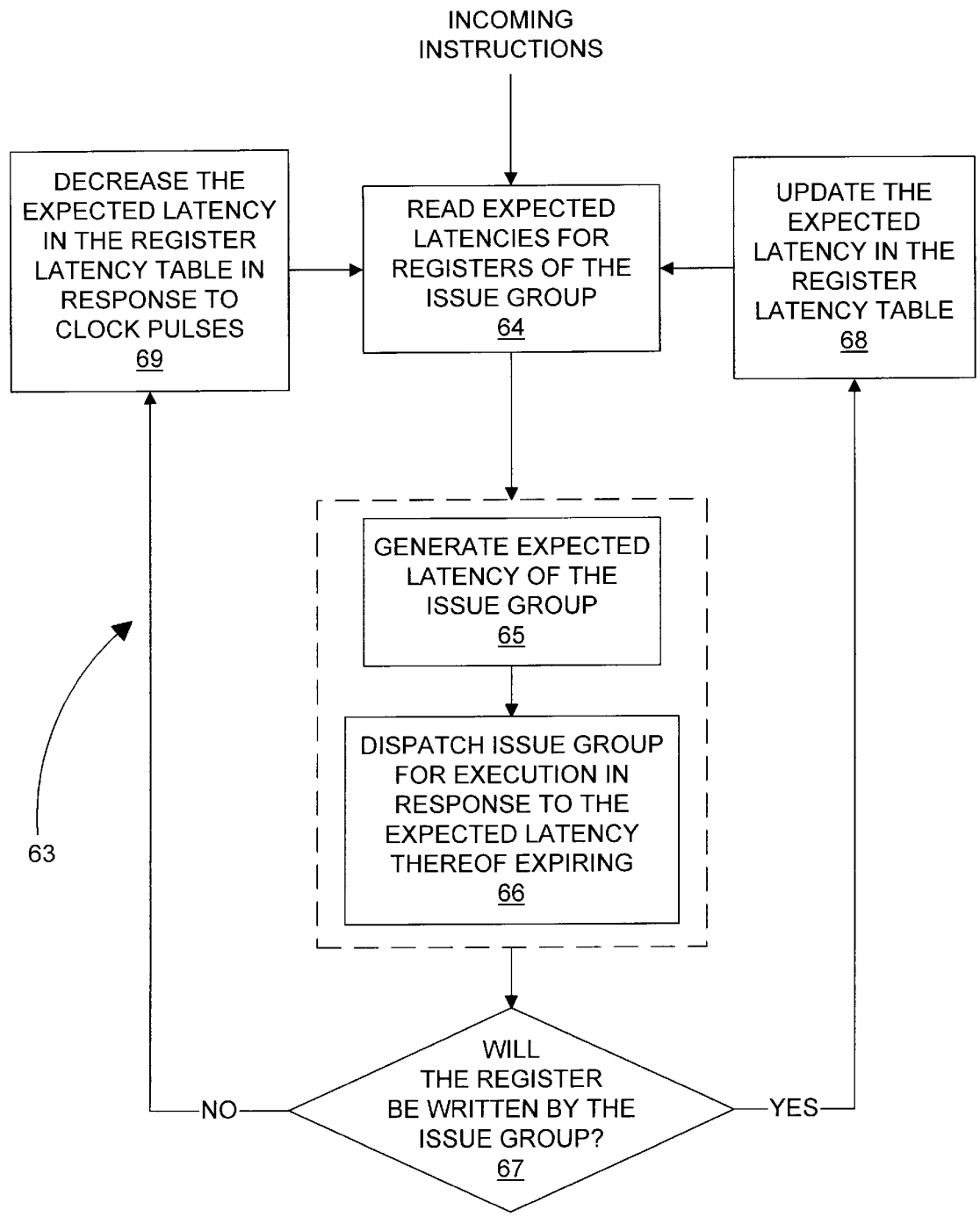

SCHEDULING INSTRUCTIONS WITH DIFFERENT LATENCIES

BACKGROUND OF THE INVENTION

1. Field of the Invention

The present invention relates generally to computers and processors, and more specifically, to scheduling instructions with different latencies.

2. Description of the Related Art

A processor retrieves and executes a sequence of instructions stored in one or more memories. Many of the instructions executed have data and/or control dependencies on earlier instructions of the sequence. Processors ordinarily schedule instructions for execution in a manner that respects the dependencies.

One such dependency concerns the availability of source and destination operands. Source and destination operands may be the respective register addresses that the instructions read and write. A source operand is available when the correct data is stored therein after earlier instructions of the instruction sequence complete their writes thereto. A destination operand is available when the instruction can write to the address after all earlier instructions of the instruction sequence have completed their reads of the address. Many processors schedule an instruction for execution in response to determining that the instruction's operands are available. Determining the availability of operands consumes time and may slow instruction processing when a large number of operands must be checked in each schedule cycle.

Modern processors may include a variety of features to increase the processing speed above that of sequential (in-order) processors. One such feature is speculative execution. In speculative execution, the processor determines expectations about dependencies before execution and checks whether the expectations turned out to be true after execution. When the expectations turn out wrong, the processor re-executes the affected instructions. Speculative execution can reduce delays caused by unresolved instruction dependencies when expectations about dependencies are accurate. A second feature, which some processors use, is superscalar processing. In superscalar processing, there are several execution units with separate entry ports. A superscalar processor can dispatch an issue group of several instructions during one clock cycle. Each instruction of the issue groups is dispatched to a different entry port. Speculative execution and superscalar processing generally need techniques for handling unresolved instruction dependencies.

Some processor pipelines stall to allow operand availability to be resolved before executing subsequent instruction. Stallable pipelines use a stall control network to handle stalls. A stall control network includes a network for sending status signals from the various pipeline stages to the stall controller and a network for broadcasting "stall" or "advance" signals from the stall controller to the various stages of the pipeline. The status signals inform the stall controller whether the results can be sent from one stage to the next for further processing. The "advance" signals enable, for example, a bank of parallel flip-flops to transmit results from one stage to the next stage. Since the receiving and broadcast networks use wires with capacitances and associated transient times, these networks cause time delays, which limit the minimum time attainable for transmitting results between the pipeline stages.

The time delays of the stall control networks are exacerbated in modern chips, which can attain substantial physical sizes and use pipelines with many stages. Both properties tend to increase the wire needed for stall control networks thereby increasing the associated time delays caused by capacitances.

Without a stall network, the processor would need to schedule one issue group during each dispatch cycle. Such timing requirements may be difficult to achieve if the processor must determine whether the registers appearing as operands of each instruction of the issue group are available in the time between dispatching subsequent issue groups. These timing requirements are even more difficult to achieve as the sizes of issue groups increase.

The present invention is directed to overcoming, or at least reducing the effects of, one or more of the problems set forth above.

SUMMARY OF THE INVENTION

In one aspect of the present invention, an apparatus is provided. The apparatus includes a clock to produce pulses and an electronic hardware structure having a plurality of rows and one or more ports. Each row is adapted to record a separate latency vector written through one of the ports. The latency vector recorded therein is responsive to the clock.

In another aspect of the present invention, a method of dispatching instructions in a processor is provided. The method includes updating a plurality of expected latencies to a portion of rows of a register latency table, and decreasing the expected latencies remaining in other of the rows in response to clock pulse. The rows of the portion correspond to particular registers.

BRIEF DESCRIPTION OF THE DRAWINGS

Other objects and advantages of the invention will become apparent upon reading the following detailed description and upon reference to the drawings in which:

FIG. 5 is a flowchart illustrating a method of scheduling instructions with the register latency table of FIGS. 1, 3, and 4A;

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Henceforth, issue group means a group of instructions dispatched for execution substantially simultaneously, i.e., during the same clock or dispatch cycle. In some embodiments, the issue groups include only one instruction.

The "actual latency" of a particular instruction depends on whether the particular instruction will write or read the register. If the particular instruction reads the register, the "actual latency" is defined to be the time for earlier instructions of the instruction sequence to perform writes to the register. If the particular instruction will write the register, the "actual latency" is the time for earlier instructions of the instruction sequence to perform writes to and reads of the register. The embodiments of the invention schedule each instruction based on "expected latencies." The embodiments of the invention employ "expected latencies" that are independent of whether the instruction performs reads or writes.

Embodiments of the present invention schedule instructions based on determinations of "expected" as opposed to "actual" register latencies. The "expected" register latencies are reset to zero at the startup of the processor. Then, the "expected" register latencies are updated based on instruction types. For example, one embodiment updates the expected register latencies for registers written by any load, any integer arithmetic, and any floating-point arithmetic instructions with the times of 2, 1 and 5 clock pulses, respectively. The particular values of the updates to the expected register latencies depend on the particular hardware implementation and are not essential to the present invention. Since scheduling uses expected register latencies, some embodiments update the expectations each time new instructions are scheduled, and other embodiments update the expectations each time new instructions are dispatched for execution.

Figure 1:
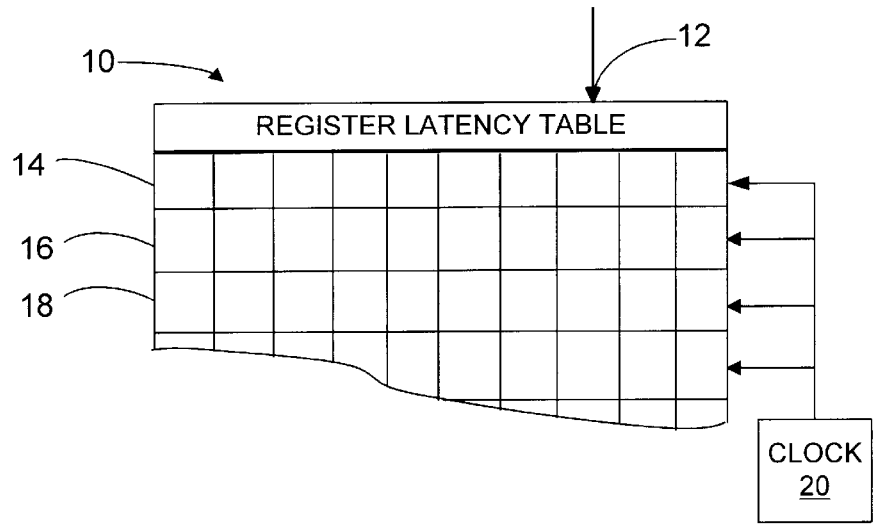
FIG. 1 is a high-level diagram illustrating a register latency table.

FIG. 1 illustrates one embodiment for a register latency table 10 used in scheduling instructions for execution. The register latency table 10 is an electronic hardware structure having a number of rows 14, 16, 18 for storing binary latency vectors, i.e., register latencies of corresponding registers (not shown). The register latency table 10 also has at least one port 12 for reading and writing latency vectors therefrom and thereto, respectively. Each row 14, 16, 18 of the register latency table 10 counts down the remaining expected latency period in response to pulses from a clock 20, i.e., the rows 14, 16, 18 track the expected register latencies in time.

Figure 2:
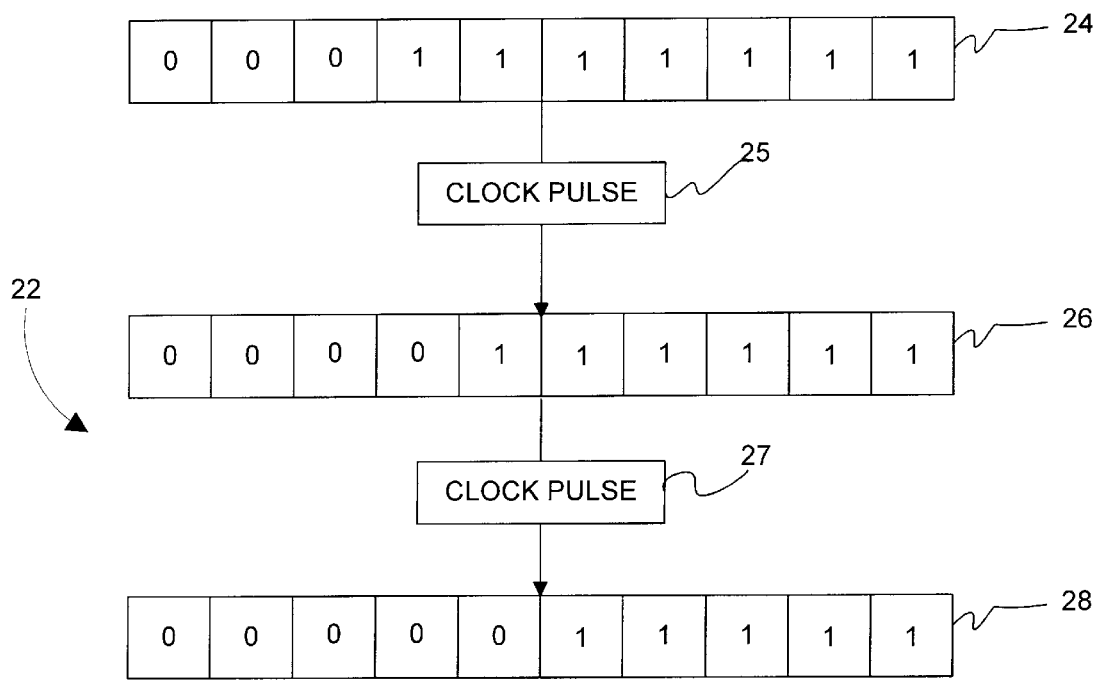
FIG. 2 illustrates one embodiment for updating the latency vector in a row of the register latency table of FIG. 1 with clock pulses.

FIG. 2 illustrates one particular embodiment 22 for the rows 14, 16, 18 of the register latency table 10 of FIG. 1 although the invention is not so limited. For the embodiment shown, each row 14, 16, 18 is a shift register, which counts down the latency vector stored therein by shifting the vector, i.e., integer division by 2. Each of the rows 14, 16, 18 of the register latency table 10 acts as a "finite state machine." "Finite state machines" are combinations of hardware and one or more registers, the hardware adapted to evolve the physical quantity stored in the registers, e.g., the rows 14, 16, 18 are adapted to temporally evolve an expected register latency to reflect the present value.

FIG. 2 illustrates the time evolution of the state of one of the rows 14, 16, 18 in one embodiment of the register latency table 10 of FIG. 1. At an initial time, control logic (not shown) makes a parallel load of a binary latency vector 24 of M binary digits into a shift register for storing M binary digits. The latency vector corresponding to a latency of N clock cycles has N consecutive digits with the value 1 and M−N consecutive digits having the value 0. After a first pulse 25 from the clock 20 of FIG. 1, the register shifts the latency vector 24 by one binary digit to produce a new latency vector 26 having N−I consecutive digits with the value 1 and M−N+1 consecutive digits with the value 0. After a second pulse 27 from the clock 20 of FIG. 1, the register shifts the latency vector 26 by another binary digit to produce a new latency vector 28 having N−2 consecutive digits with the value 1 and M−N+2 consecutive digits with the value 0. After N clock cycles, the latency vector (not shown) would contain M digits with the value 0. Each row 14, 16, 18 of the register latency table 10 of FIG. 1 shifts the latency vector stored therein by 1 binary digit at each pulse of the clock 20 of FIG. 1. By shifting the expected latencies, the register latency table 10 "tracks" the expected register latencies and thereby stores the remainder of the expected register latencies.

The remainders of the expected register latencies are the expected register latencies that remain after subtracting the time elapsed since the last update. The various embodiments may update the expected register latencies either in response to retrieving instructions, scheduling instructions, dispatching instructions or at another time in the instruction processing sequence before execution.

Other embodiments may use other methods for tracking the remainder of the expected register latencies in each row 14, 16, 18 of the register latency table 10. In one such embodiment, the rows 14, 16, 18 of the register latency table may act as decrementing counters, i.e., subtracting 1 from the present expected register latency at each pulse of the clock 20. The rows 14, 16, 18 act as "finite state machines" that modify the expected latencies stored therein to reflect the present physical value.

Figure 3:
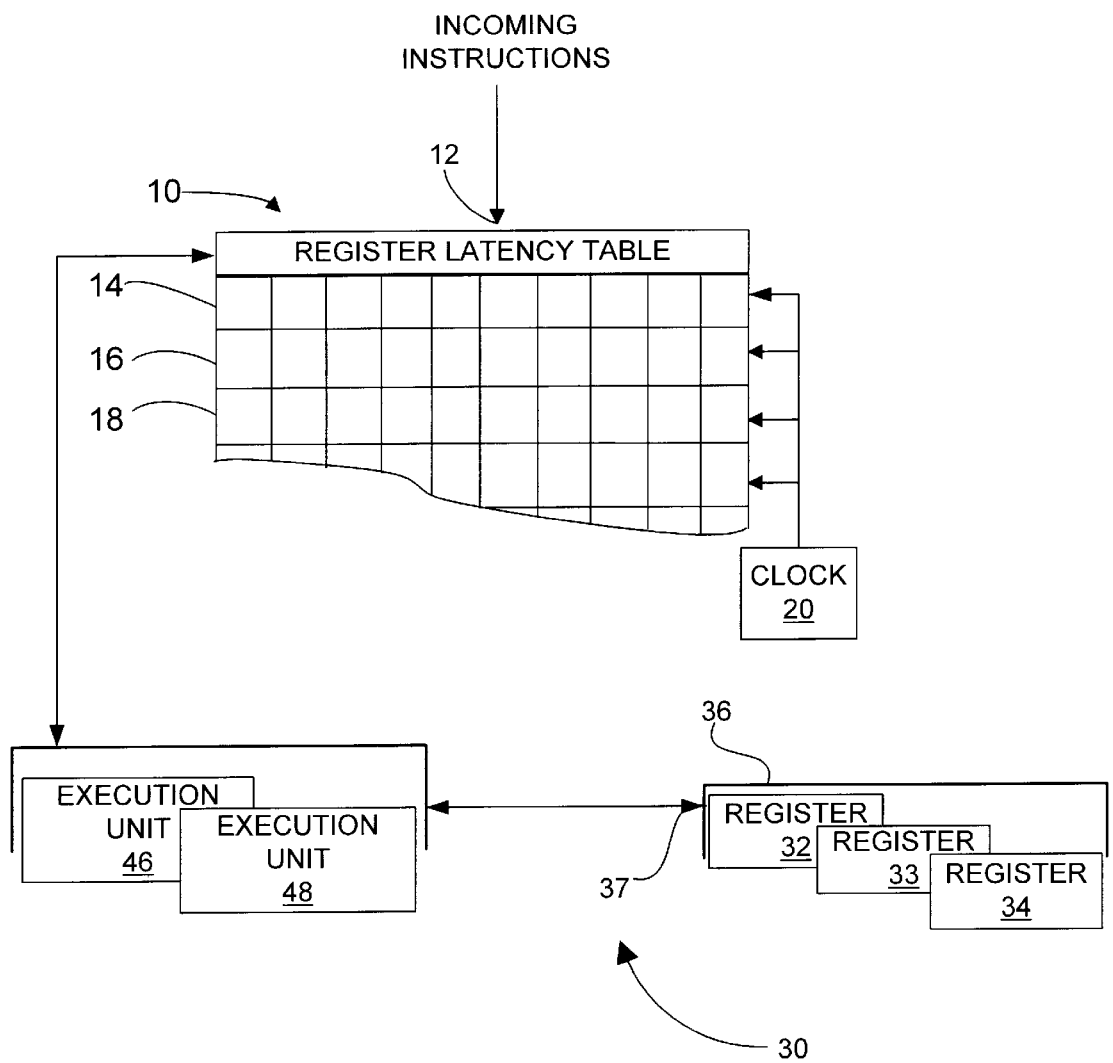
FIG. 3 illustrates a portion of a processor that employs the register latency table of FIG. 1 to schedule instructions for execution on parallel execution units.

FIG. 3 illustrates a portion of a processor 30 that employs the register latency table 10 of FIG. 1 to schedule the dispatch of instructions for execution. The processor 30 includes a plurality of internal registers 32, 33, 34 for storing data read and written by instructions. The registers 32, 33, 34 form a register file 36. In some embodiments, the register latency table 10 and the register file 36 have the same number of read ports 12, 37 and the same number of write ports 12, 37. Each row 14, 16, 18 of the register latency table 10 stores a static latency vector for one of the registers 32, 33, 34. Both the register latency table 10 and the register file 36 have one row for each of the internal registers 32, 34, 36. The processor 30 has a plurality of execution units 46, 48. The processor 30 schedules an issue group of instructions to be dispatched to the execution units 46, 48 at or after the time that the registers 32, 33, 34 of instructions therein are expected to be available, i.e., as determined by the latency vectors of the register latency table 10.

Referring still to FIG. 3, the processor 30 uses the register latency table 10 to enforce program dependencies statically, i.e., enforces expected dependencies that are a function of the type of instruction. The register latency table 10 provides static expectations for the latencies of the portion of the registers 32, 33, 34, which an instruction either will read or write. The processor 30 does not dispatch the instruction until the static expected latencies, i.e., expected latencies of earlier instructions writing the portion of the registers 32, 33, 34, have expired. Scheduling based on static expected latencies can reduce the number of violations of instruction dependencies.

In an alternate embodiment, instructions are scheduled and dispatched to a pipeline stage earlier than the execution stage such that the instructions eventually arrive at the execution stage with the proper expected latency.

Figure 4A:
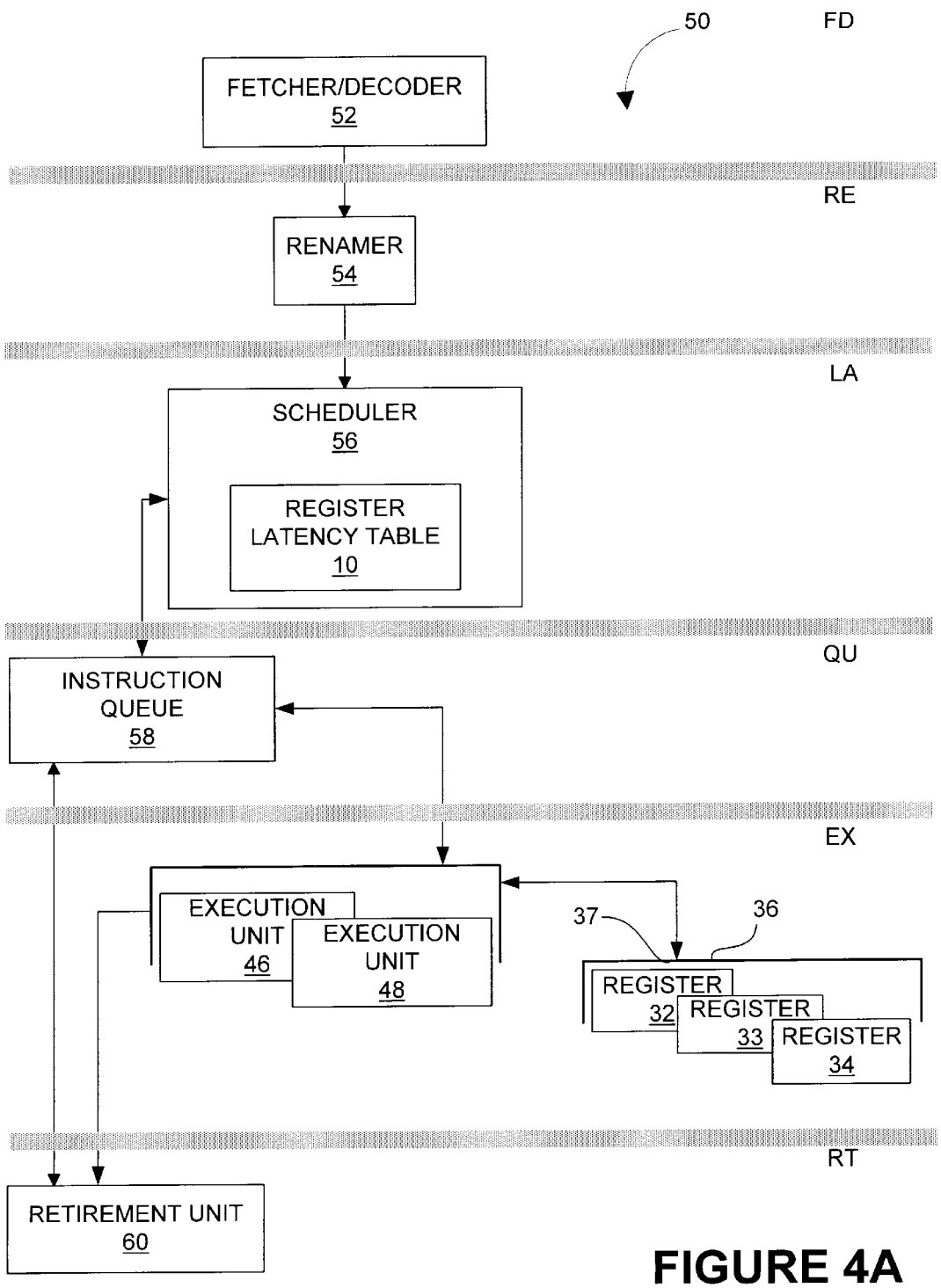
FIG. 4A is a high-level block diagram of a processor that schedules instructions for execution on parallel execution units.

FIG. 4A illustrates a pipelined processor 50, which uses the register latency table 10 of FIG. 1. A fetcher/decoder 52 retrieves instructions from memory (not shown) and produces decoded issue groups of instructions executable on the hardware execution units 46, 48. A renamer 54 assigns a portion of the registers 32, 33, 34, which are internal to the processor 50, to the dummy operands of the decoded instructions. A scheduler 56 statically determines an expected latency, for each issue group, and writes the issue group and the expected latency to a row (not shown) in an instruction queue 58. "Statically determines" means that the processor hardware assigns a fixed "expected latency" to instructions that depends on the instruction class. For example, one embodiment might assign to registers written by all load, all integer arithmetic, and all floating-point instructions the respective expected latencies of 2, 1 and 5 clock pulses. The instruction queue 58 is adapted to dispatch each issue group to the plurality of aligned execution units 46, 48 so that execution of the instructions of the issue group starts in parallel. The processor 50 uses the register latency table 10 to determine the expected latency of each issue group, i.e., the period for all instructions of the issue group to be ready for dispatch. The retirement unit 60 retires instructions of the issue group and updates the instruction queue 58 if the issue group executed properly.

Figure 4B:
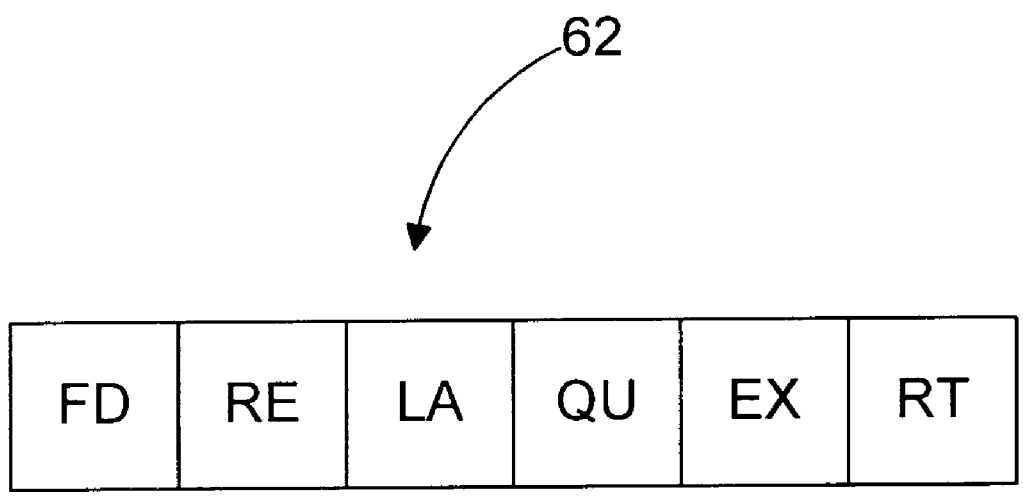
FIG. 4B illustrates a pipeline for one embodiment of the processor of FIG. 4A.

FIG. 4B illustrates a pipeline 62 for one embodiment of the processor 50 of FIG. 4A. At a fetch/decode stage (FD), the fetcher/decoder 52 produces an issue group of instructions to send to the renamer 54. At a rename stage (RE), the renamer 54 assigns a portion of the internal registers 32, 33, 34 to the dummy operands of the instructions. In a latency determination stage (LA), the scheduler 56 looks up the latency vectors of the registers 32, 34, 36 of the instructions in the register latency table 10 of FIG. 4A to determine the expected number of clocks before the source registers of the instructions will be available. In the LA stage, the scheduler 56 also determines the expected latency for the issue group itself. In a queuing stage (QU), some embodiments, the scheduler 56 completes the determination of the expected latency for the issue group. In the QU stage, the scheduler 56 writes the issue group to the address in the instruction queue 58 attaching a binary code segment for the expected latency. In the QU stage, the scheduler 56 also updates the latency vectors of the register latency table 10. At the execution stage (EX), the instruction queue 58 dispatches the next issue group for execution after counting down the expected latency for the issue group. At a retirement stage (RT), the retirement unit 60 retires properly executed instructions. As those skilled in the art will appreciate, the demarcation of the FD, RE, LA, QU, EX, and RT stages in the processor pipeline 62 may not be as distinct as might appear from FIG. 4B. For example, one or more of the stages may overlap with other stages.

Still referring to FIG. 4B, the stages FD, RE, LA, QU, EX, and RT are merely representative and are neither exhaustive nor exclusive of stages that might be present in various alternative embodiments. Thus, the precise structure of the stages of the pipeline 62 are not pertinent to the practice of the invention.

FIG. 5 is a flowchart illustrating a method 63 for scheduling instructions with the register latency table 10 of FIGS. 1, 3 and 4A. At block 64, the scheduler 56 reads the expected latencies for a portion of the registers 32, 33, 34, which appear as operands of instructions from an incoming issue group, i.e., the LA stage in FIG. 4B. At block 65, the scheduler 56 generates an expected latency for the issue group from the expected latencies of the portion of the registers 32, 33, 34 appearing therein, i.e., the LA or QU stage in FIG. 4B. In one embodiment, the expected latency of the issue group is equal to the maximum latency for the registers to be written by instructions of the issue group. At block 66, the instruction queue 58 dispatches the issue group to the execution units 46, 48 in response to the expected latency of the issue group expiring, i.e., the QU to EX stages in FIG. 4B. At block 67, the scheduler 56 determines which of the registers 32, 33, 34 will be written by the issue group, i.e., the QU stage. At block 68, the scheduler 56 updates the register latency table 10 for the portion of the registers 32, 33, 34 that will be written by the issue group, e.g., by subtracting the latency of the issue group from the remaining latencies of these registers. At block 69, the register latency table 10 decreases the expected latencies of each register, which will not be written by the issue group, in response to clock pulses. Blocks 67, 68, and 69 are performed on a register by register basis. In one embodiment, the updating occurs in stage QU of FIG. 4B. In other embodiments, the updating occurs in stage EX of FIG. 4B, i.e., at dispatch instead of during scheduling.

Still referring to FIG. 5, the various embodiments use different formulas for updating the expected register latencies at block 68. For example, the update may replace an expected register latency of the register latency table 10 with the greater of the present expected register latency and the expected latency of the next issue group, which will write to the register. Other formulas for updating registers are possible. The various formulas enable updating expected register latency at or before the dispatch of each issue group.

Referring to FIG. 4A, the instruction queue 58 may be a circular buffer, which dispatches issue groups sequentially. A pointer (not shown) of the instruction queue 58 indicates the last issue group dispatched. The instruction queue 58 counts down the remaining latency for the next issue group and advances the pointer to dispatch the next issue group in response to the latency of the next issue group expiring. The instruction queue 58 dispatches NO-INSTRUCTION issue groups, i.e., issue groups without executing operations, during dispatch cycles in which the latency is being counted down. The execution units 46, 48 do not execute NO-INSTRUCTION issue groups, and the retirement unit 60 retires NO-INSTRUCTION issue groups without committing any results therefrom to the architectural state. In some embodiments, the execution and retirement units 46, 48, 60 recognize NO-INSTRUCTION issue groups by one or more special bits reserved to indicate the "NO-INSTRUCTION" status. Thus, the processor 50 of FIGS. 4A does not stall the instruction pipeline 62 of FIG. 4B when no issue group is expected to be ready for execution. In response to exceptions or execution errors after the RE stage in the pipeline 62 of FIG. 4B, the processor 50 of FIG. 4A dispatches NO-INSTRUCTION issue groups, and the execution units 46, 48 do not execute instructions therefrom. The processor 50 of FIG. 4A may have other apparatus and/or queues to handle errors occurring in stages earlier than the LA stage of the pipeline 62 of FIG. 4B. The pipeline 62 of FIG. 4B has no stall network, which might otherwise reduce the operating speed as in stallable pipelines.

Referring to FIGS. 4A and 5, the processor 50 may use a second formula to update the register latency table 10 at block 68. Between the dispatch of two sequential issue groups, e.g., IG1 and IG2, the processor 50 dispatches a number X of NO-INSTRUCTION issue groups equal to the expected latency of the second issue group, i.e., X is the expected latency for IG2. If the update due to IG2 occurs at scheduling, i.e., block 68 is simultaneous to block 64 or 65, the above-described first update formula can over-estimate the latency of a later issue group. For example, the next issue group, IG3, will wait in the instruction queue 58 while the X NO-INSTRUCTION issue groups for IG2 are dispatched. The register latency table 10 expectations take into account the time between dispatch and completion of IG2, but do not account for waiting while the X NO-INSTRUCTION's are dispatched.

Still referring to FIGS. 4A and 5, the second formula for updating the latency table when IG2 is scheduled has two steps. First, the scheduler 56 subtracts the expected latency X of IG2 from all expected register latencies of the register latency table 10. Negative expected register latencies are taken to be zero. Second, the scheduler 56 replaces each remaining expected register latency of the register latency table 10 by the greater of the remaining expected register latency and the latency of the issue group IG2, which will write to the register. Embodiments employing the second formula can attribute a shorter latency to the subsequent issue group, i.e. IG3.

Figure 6:
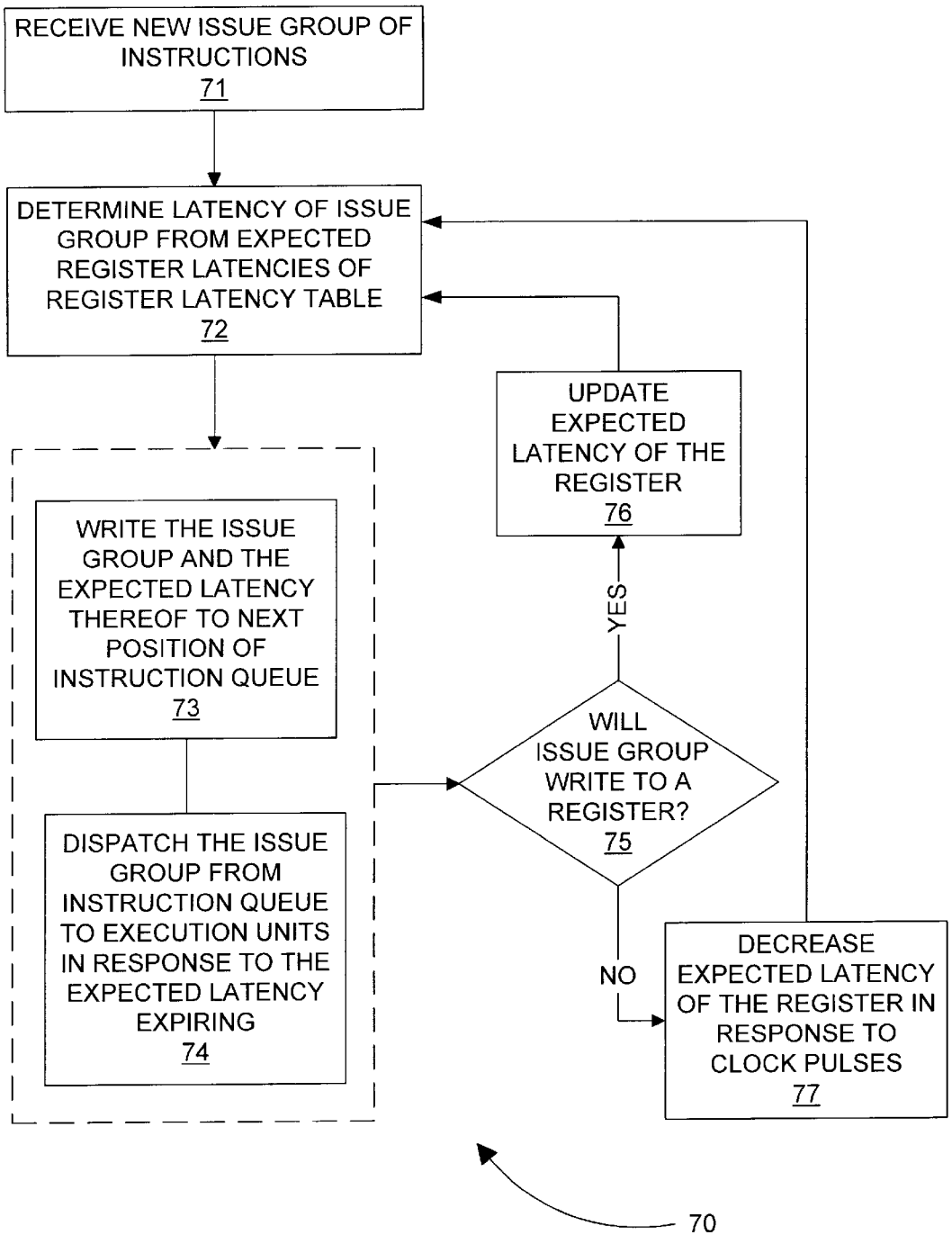
FIG. 6 is a flowchart illustrating a first method of processing instructions in the processor of FIG. 4A.

FIG. 6 is flowchart of a method 70 for processing instructions in the processor 50 of FIG. 4A. At block 71, the scheduler 56 receives a new issue group of instructions from the renamer 54. At block 72, the scheduler 56 determines an expected latency for the issue group from the expected register latencies in the register latency table 10. In one embodiment, the expected latency is the maximum latency of the portion of the registers 32, 33, 34, which are source operands of the instructions of the issue group. At block 73, the scheduler 56 writes the issue group and the expected latency to the next position in the instruction queue 58. At block 74, the instruction queue 58 dispatches the issue group to the execution units 46, 48 in response to the expected latency of the issue group expiring. At block 75, the scheduler 56 determines whether the issue group will write each of the registers 32, 33, 34. At block 76, the scheduler 56 updates the latencies of the portion of the registers 32, 33, 34 that is determined will be written by the dispatched the issue group. At block 77, the clock 20 decreases the latencies of the portion of the registers 32, 33, 34 of the register latency table 10, which will not be written by the issue group, in response to clock pulses. The latency updating and decreasing performed in blocks 76, 77 "tracks" the latencies in the register latency table 10 for the scheduling of subsequent issue groups at block 72.

Figure 7:
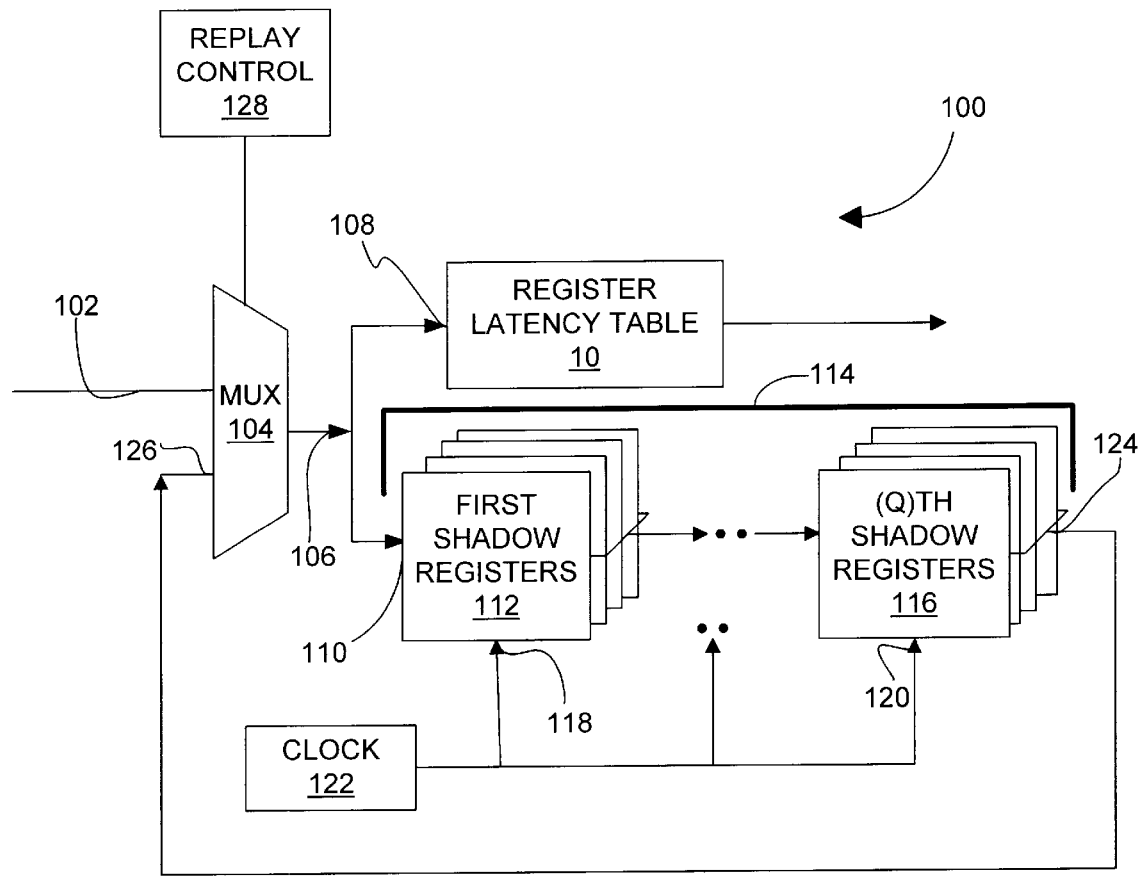
FIG. 7 shows a structure for replaying the latency vectors in a register latency table by flash copying with vectors latency that are delayed by N clock cycles.

FIG. 7 shows one embodiment of a replay structure 100 for the register latency table 10 of FIGS. 1,3, and 4A. A line 102 brings incoming latency vectors to the register latency table 10. The line 102 connects to a first set of inputs of a multiplexor (MUX) 104. An output of the MUX 104 connects to write ports 108 of the register latency table 10 and to write ports 110 of a first set of shadow registers 112. The first set of shadow registers 112 has a separate register for each row 14, 16, 18 of the register latency table 10, as shown in FIGS. 1 and 3. The first set of shadow registers 112 is the first member of a series 114 of identical sets of shadow registers 112, 116 having outputs and inputs connected serially. A clock 122 controls enable inputs 118, 120 of the shadow registers 112, 116 so that clock pulses cause data to be transmitted down the series 114. The illustrated series 114 outputs a state of the register latency table 10, which has been delayed by Q clock pulses. The output 124 of the last set of shadow registers 116 connects to a second set of inputs 126 of the MUX 104. A replay control 128 selects either the line 102 for incoming latency vectors or the second input 126 for latency vectors delayed by the shadow series 114, i.e. replayed latency vectors.

Still referring to FIG. 7, the replay control 128 can select either to store new latencies from the line 102 or to recopy old latency vectors, delayed by Q cycles of the clock 122, from the line 126 to the register latency table 10. Each of the sets of shadow registers 112, 116 of the series 114 delays the replayed latency vectors by one cycle of the clock 122. The replay control 128 selects to recopy delayed latency vectors to the register latency table 10 in response to exceptions or execution errors. The step of recopying enables recovery from errors and exceptions occurring in pipeline stages after the RE stage by replaying the remainder of the pipeline 62 of FIG. 4B with the delayed copy of the register latency table 10. The time delays for hardware (not shown) to detect exceptions and/or errors and to order a replay determines the needed delay and the length of the series 114. Thus, the length of the series 114 is implementation dependent.

Referring to FIG. 4A, 4B, and 7, replay of the latency vectors in the register latency table 10 may be ordered to handle and/or correct exceptions and/or execution errors. The register latency table 10 is returned to an earlier state associated with issue groups that are re-dispatched for re-execution to recover from exceptions and/or execution errors in the non-stallable pipelines 50, 62 FIG. 4A–4B. The replay structure 100 is a means for delaying and replaying latency vectors of the register latency tables of FIG. 1, 3, 4A and an embodiment for handling execution exceptions and errors in the non-stallable pipeline 62 of FIG. 4B by replaying.

Figure 8:
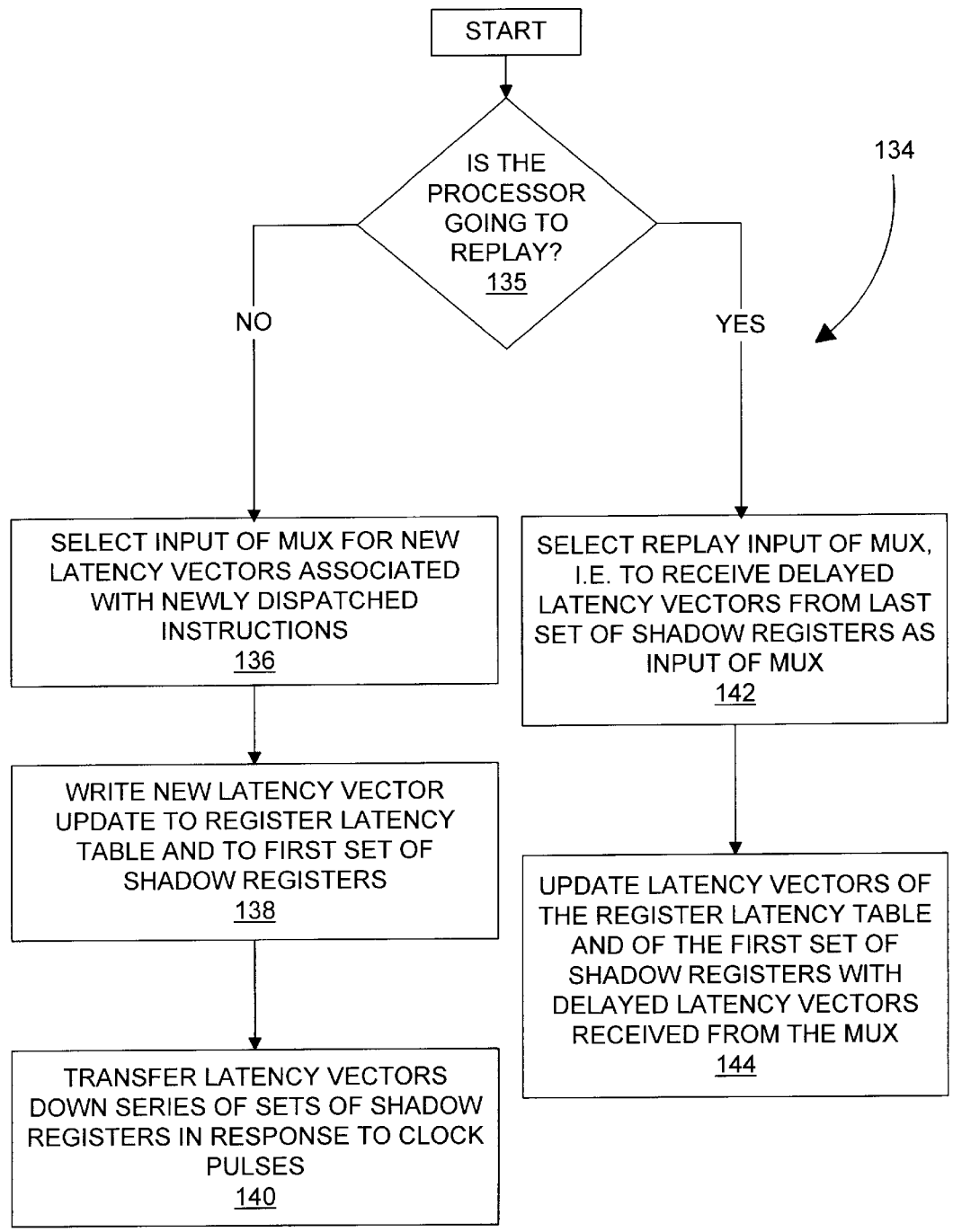
FIG. 8 is a flowchart illustrating the operation of the replay structure of FIG. 7.

FIG. 8 is a flowchart illustrating a method 134 of replaying the latency vectors of the register latency table 10 with the replay structure 100 of FIG. 7. At block 135, the processor 30, 50 of FIG. 3 or 4A decides whether to replay of the portion of the pipeline 62 of FIG. 4B following the RE stage, e.g., to recover from an execution exception or error. At block 136, the replay control 128 selects the line 102, which brings new latency vectors to the MUX 104, i.e., an update, if the processor 30, 50 of FIGS. 3 or 4A decides to replay. At block 138, the scheduler 56 updates the register latency table 10 by writing new latency vectors thereto. The scheduler 56 simultaneously writes the update to the first set of shadow registers 112. At block 140, timing pulses from the clock 122 transmit the latency vectors down the series 114 of sets of shadow registers 112, 116. At block 142, the replay controller 128 selects the second input 126 of the MUX 104 to receive delayed latency vectors from the last set of shadow registers 116 in response to the processor 50 of FIG. 4A deciding to replay the pipeline 62 after the RE stage. At block 144, the replay structure 100 updates the register latency table 10 and the first set of shadow registers 112 with the replayed latency vectors from the MUX 104. The instruction queue 58 of FIG. 4A will then institute a replay by re-dispatching the issue group associated with the recopied and delayed entries for the register latency table 10.

Thus, the present invention provides a mechanism to statically schedule the execution of instructions of differing latencies such that operands are available at the time of execution. The mechanism determines, in advance, the expected availability of operands and dispatches NO-INSTRUCTIONS as needed so that issue groups are available for execution without having to stall the pipeline. Thus, although the invention is not so limited, the invention is particularly useful in non-stallable pipelines such as those which employ replay instead of stalling. In such a non-stallable pipeline, the invention enables introducing delays, which were traditionally introduced by stalling the pipeline when faced with instructions of non-unit latency.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
    a clock; and
    an electronic hardware structure having a plurality of rows and one or more ports, each row adapted to record a latency vector written through one of the ports, the latency vector stored therein being responsive to the clock.

2. The apparatus as set forth in claim 1, wherein each row includes a shift register further including a shift control electrically connected to the clock.

3. The apparatus as set forth in claim 1, further comprising:
    a plurality of registers; and
    wherein each row is a finite state machine.

4. The apparatus as set forth in claim 3, wherein the latency vector is an expected latency of one of a scheduled instruction and a scheduled issue group of instructions.

5. The apparatus as set forth in claim 3, wherein the plurality of registers belong to a register file, the register file and the electronic hardware structure having the same number of read ports and the same number of write ports.

6. The apparatus as set forth in claim 3, wherein the plurality of registers belong to a register file, the register file and the electronic hardware structure having the same number of rows, the number of rows being the number of registers in the register file.

7. The apparatus as set forth in claim 1, further comprising:
    at least one execution unit; and
    a device to dispatch instructions to the execution unit in response to the latency vectors for operands of the instructions providing an expectation that the operands are available.

8. The apparatus as set forth in claim 7, further comprising at least one other execution unit, the device to dispatch an issue group to the execution units in response to latency vectors providing an expectation that operands of the instructions of the issue group are available.

9. The apparatus as set forth in claim 1, further comprising:
    a series of sets of shadow registers adapted to delay an input signal by a preselected number of clock cycles, each set having one register for each row of the electronic hardware structure; and
    a multiplexer having first and second inputs and an output, the first inputs to receive latency vectors, the second inputs to receive the signal from an output of the series of sets of shadow registers, the output of the multiplexer connected, in parallel, to inputs of both the electronic hardware structure and to the series of sets of shadow registers.

10. The apparatus as set forth in claim 1, further comprising means for delaying and replaying the latency vectors in the electronic hardware structure.

11. A processor, comprising:
    a register file including a plurality of registers;
    a plurality of execution units to execute instructions, a portion of the instructions to perform one of write to and read from the registers;
    a register latency table to track expected register latencies of the registers; and
    a clock to update the latencies of the register latency table.

12. The processor as set forth in claim 11, wherein the register latency table and the register file both have one row for each one of the registers.

13. The processor as set forth in claim 12, wherein the register latency table and the register file have the same number of read ports and the same number of write ports.

14. The processor as set forth in claim 11, further comprising a scheduler to use the expected register latencies of the register latency table to schedule issue groups for dispatch to the execution units.

15. The processor, as set forth in claim 14, wherein the scheduler to schedule an issue group for dispatch, the dispatch to be performed in response to the expiration of the expected register latencies of a portion of the registers of the instructions of the issue group.

16. The processor as set forth in claim 14, further comprising an instruction queue, the scheduler being adapted to write a first issue group and an expected latency of the first issue group to the instruction queue, the instruction queue to dispatch the first issue group in response to counting down the expected latency of the first issue group.

17. The processor as set forth in claim 16, wherein the execution units, the scheduler, and the instruction queue are elements of a pipeline, the pipeline being non-stallable.

18. The processor as set forth in claim 11, further comprising:
    a series of sets of shadow registers to delay an input signal by a preselected number of clock cycles; and
    a multiplexer having first inputs to receive latency vectors and second inputs to receive the signal from the series of sets of shadow registers, the output of the multiplexer connected, in parallel, to inputs of both the register latency table and to an output of the series of sets of shadow registers.

19. The processor as set forth in claim 18, further comprising a replay controller adapted to select the second inputs of the multiplexor in response to selected execution errors and exceptions.

20. A method of dispatching instructions in a processor, comprising:
    updating a plurality of expected latencies to a portion of rows of a register latency table, the rows of the portion corresponding to particular registers; and
    decreasing expected latencies remaining in other of the rows in response to a clock pulse.

21. The method as set forth in claim 20, further comprising:
    reading the expected latencies of a second portion of the rows, the second portion of the rows corresponding to a portion of registers assigned to instructions of a first issue group; and
    dispatching the first issue group for execution in response to the read expected latencies of the second portion of the rows expiring.

22. The method as set forth in claim 21, wherein the first issue group includes only one instruction.

23. The method as set forth in claim 20, wherein the act of updating expected latencies is in response to scheduling one or more instructions, each of the one or more instructions to read one of the particular registers and write one of the particular registers.

24. The method as set forth in claim 20, wherein the act of updating is performed in response to the scheduling a second issue group of instructions, the second issue group to write the particular registers.

25. The method as set forth in claim 24, wherein the act of decreasing is performed to the other of the rows in response determining that the second issue group will not write registers corresponding to the other of the rows.

26. The method as set forth in claim 21, wherein the act of updating expected latencies is in response to the act of dispatching one or more instructions, each of the one or more instructions to perform one of reading one of the particular registers and writing one of the particular registers.

27. The method as set forth in claim 21, wherein the act of dispatching includes sending each instruction of the first issue group to a different execution port.

28. The method as set forth in claim 21, further comprising:
   writing the instructions of the first issue group to a row of an instruction queue; and
   wherein the act of dispatching sends all of the instructions from one row of the instruction queue for execution in response to the expected register latencies of the instructions of the row expiring.

29. The method as set forth in claim 28, wherein the acts of updating, reading, dispatching and writing do not include determining whether next stages of the processor are ready before transferring results therefrom to the next stages.

30. A method of executing instructions in a processor, comprising:
   receiving an issue group of instructions;
   determining an expected latency for the issue group from expected latencies of a portion of the registers assigned to the instructions of the issue group,
   updating expected register latencies of registers to be written by the issue group, the expected latency for the issue group determining the update of the expected register latencies;
   writing the issue group to an instruction queue; and
   dispatching the issue group for execution in response to the expected latency for the issue group expiring.

31. The method as set forth in claim 30, wherein the expected latency for an instruction is a static expectation of when source registers of the instruction will be available.

32. The method as set forth in claim 30, further comprising tracking the expected register latencies in response to clock pulses.

33. The method as set forth in claim 30, wherein the act of writing puts the issue groups in the next sequential position of the instruction queue and wherein the act of dispatching sends the written issue group after earlier issue groups have been dispatched.

34. The method as set forth in claim 30, wherein the act of updating the expected register latencies is performed in response to dispatching an issue group for execution.

35. The method as set forth in claim 30, wherein the acts of receiving, updating, determining, depositing, and dispatching do not include determining whether next stages of the processor are ready before transferring results there from to the next stages.

36. A processor, comprising:
   an instruction fetch unit to retrieve instructions;
   a plurality of registers;
   a register latency table to track expected register latencies of the registers;
   an instruction queue to store a plurality of issue groups of instructions;
   a plurality of execution units aligned for parallel execution of the instructions of each issue group received from the instruction queue; and
   a scheduler to write the issue groups to the instruction queue, the instruction queue to dispatch a particular issue group in response to an expected latency of the particular issue group expiring.

37. The processor as set forth in claim 36, the scheduler to determine the expected latency for the issue groups and to write the expected latencies to the instruction queue.

38. The processor as set forth in claim 37, wherein the expected latency of a first of the issue groups is the greatest of expected register latencies of registers appearing as source operands of the instructions of the first of the issue groups.

39. The processor as set forth in claim 36, wherein the register latency table is adapted to update the expected register latency of a given register in response to the dispatch of a given instruction, the given instruction to one of write to and read from the given register.

40. The processor as set forth in claim 36, wherein the register latency table is adapted to track the expected register latencies in response to clock pulses.

41. The processor as set forth in claim 36, wherein the instruction queue is adapted to dispatch issue groups to the execution units in a first-in first-out fashion.

42. The processor as set forth in claim 36, further comprising:
   a series comprising one or more sets of shadow registers adapted to delay an input signal by a preselected number of clock cycles, one register of the set corresponding to each row of the register latency table; and
   a multiplexer having first inputs to receive latency vectors and second inputs to receive the signal from the last set of the series, the output of the multiplexer connected, in parallel to inputs of both the register latency table and the series of sets of shadow registers.

43. The processor as set forth in claim 39, further comprising means for delaying the update of the expected register latencies and means for replaying the expected register latencies in response to one of an execution exception and an error.

44. The processor as set forth in claim 39, wherein the processor has the form of a non-stallable pipeline.

45. A method of executing and replaying instructions, comprising:
   writing latency vectors of a portion of the registers assigned to an issue group of instructions to both a register latency table and a series of sets of shadow registers in response to scheduling the issue group;
   dispatching the issue group to execution units without determining whether the execution units are available;
   delaying the latency vectors written to the series by a preselected time period; and writing the delayed latency vectors from the series to the register latency table in response to detecting one of an execution exception and an error in response to executing the issue group.

46. The method as set forth in claim 45, further comprising re-dispatching a portion of the instructions of the issue group to the execution units in response to the detecting of one of an execution exception and an error in the portion of the instructions.

47. The method as set forth in claim 46, further comprising dispatching NO-INSTRUCTION issue groups to the execution units in response to determining that the next issue group to be dispatched has a non-zero expected latency.

* * * * *